(12) United States Patent
Furui (10) Patent No.: US 9,342,868 B2
(45) Date of Patent: May 17, 2016

(54) IMAGE DISPLAY DEVICE, IMAGE DISPLAY METHOD, AND IMAGE DISPLAY PROGRAM

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 198 days.

(21) Appl. No.: 13/948,589

(22) Filed: Jul. 23, 2013

(65) Prior Publication Data
US 2014/0028705 A1 Jan. 30, 2014

(30) Foreign Application Priority Data

Jul. 26, 2012 (JP) ................... 2012-165840

(51) Int. Cl.
*G06T 5/00* (2006.01)
*H04N 9/31* (2006.01)
*H04N 7/01* (2006.01)

(52) U.S. Cl.
CPC .. *G06T 5/00* (2013.01); *H04N 9/31* (2013.01); *H04N 9/3185* (2013.01); *H04N 9/3188* (2013.01); *H04N 9/3194* (2013.01); *G09G 2320/0285* (2013.01); *G09G 2340/0442* (2013.01); *H04N 7/0122* (2013.01)

(58) Field of Classification Search
None
See application file for complete search history.

(56) References Cited

U.S. PATENT DOCUMENTS

| | | | |
|---|---|---|---|
| 6,081,158 A * | 6/2000 | Twitchell et al. | 330/149 |
| 2003/0169247 A1* | 9/2003 | Kawabe et al. | 345/204 |
| 2005/0179875 A1* | 8/2005 | Aoyanagi | 353/101 |
| 2005/0214662 A1 | 9/2005 | Kobayashi et al. | |
| 2006/0087588 A1* | 4/2006 | Cok | G09G 3/3216 348/556 |
| 2007/0024750 A1* | 2/2007 | Wing Chung et al. | 348/556 |
| 2008/0204670 A1 | 8/2008 | Furui | |
| 2011/0216284 A1* | 9/2011 | Chae et al. | 353/30 |
| 2012/0069177 A1* | 3/2012 | Nagano et al. | 348/135 |

FOREIGN PATENT DOCUMENTS

| | | |
|---|---|---|
| JP | A-2005-286572 | 10/2005 |
| JP | 2006060562 A * | 3/2006 |
| JP | A-2008-211354 | 9/2008 |

* cited by examiner

*Primary Examiner* — Jwalant Amin
(74) *Attorney, Agent, or Firm* — Oliff PLC (57) ABSTRACT

An image display device is capable of realizing an effective corrected shape of the image. The image display device includes an image input section to which an image is input, an aspect ratio determination section adapted to determine an aspect ratio of the image input to the image input section, a correction section adapted to perform a correction on the image input to the image input section so that the image has an aspect ratio corresponding to an aspect ratio determined by the aspect ratio determination section, and a projection section adapted to project the image on which the correction is performed by the correction section.

7 Claims, 6 Drawing Sheets

5:4 CASE

FIG. 3A

4:3 CASE

FIG. 3B

16:10 CASE

FIG. 3C

16:9 CASE

ASPECT RATIO OF SCREEN AND INPUT VIDEO IS 4:3
ASPECT RATIO OF PROJECTOR IS 16:9

FIG. 6A

ASPECT RATIO OF SCREEN AND INPUT VIDEO IS 16:9
ASPECT RATIO OF PROJECTOR IS 4:3

FIG. 6B

IMAGE DISPLAY DEVICE, IMAGE DISPLAY METHOD, AND IMAGE DISPLAY PROGRAM

The entire disclosure of Japanese Patent Application No. 2012-165840, filed Jul. 26, 2012, is expressly incorporated by reference herein.

BACKGROUND

1. Technical Field

The present invention relates to an image display device, an image display method, and an image display program.

2. Related Art

Regarding an automatic image correction function with respect to a screen frame in a projector, there are known, for example, a technology described in JP-A-2005-286572 (Document 1) and a technology described in JP-A-2008-211354 (Document 2).

In the technology described in Document 1, there is disclosed, for example, an image processing system including an image projection device adapted to project an image toward a rectangular projection object (e.g., a screen) via a projection panel, a position adjustment information generation device adapted to generate position adjustment information based on a position adjustment of the image performed by the user, a correction information generation device adapted to generate position correction information for correcting the positions of the four corners of the image in the projection object based on the position adjustment information, and a correction device adapted to correct image information for projecting the image based on the position correction information, wherein the correction information generation device calculates the aspect ratio of the projection object based on the position adjustment information in the state in which the four corners of the image and the four corners of the projection object coincide with each other due to the position adjustment of the image performed by the user, and then generates the position correction information so that the image has a predetermined aspect ratio based on the aspect ratio thus calculated (see, e.g. Claim 1 of Document 1).

In the technology described in Document 2, there is disclosed, for example, a projector including a projection section adapted to project a calibration image toward a projection object via a projection panel, a shape determination section adapted to determine the shape of at least a part of the projection object based on one of imaging information from an imaging section in the state in which the calibration image is projected on the projection object and operation information from an operation section in that state, a correction target area setting section adapted to set a correction target area, which is an area following the shape determined by the shape determination section and is an area in the projection panel, an aspect ratio calculation section adapted to calculate the aspect ratio of the correction target area, a determination section adapted to determine whether or not a value representing a difference between the aspect ratio of the correction target area and a reference aspect ratio fulfills a preset condition, and an image generation section adapted to generate an image on the projection panel so as to have the shape of the correction target area in the case in which the preset condition is fulfilled and generate an image with the reference aspect ratio on the projection panel in the case in which the preset condition fails to be fulfilled (see, e.g. Claim 1 of Document 2).

However, in the automatic image correction function with respect to the screen frame in the projector according to the related art described above, a fixed aspect ratio having previously been determined such as the aspect ratio of the liquid crystal panel is used as the aspect ratio (or the reference thereof) of the corrected shape of the image.

Therefore, there arises a problem that the projection video is projected at an aspect ratio different from the aspect ratio of the input video, and thus the impression of the video varies in some cases.

Further, in the case in which both of the aspect ratio of the screen and the aspect ratio of the input video are vertically longer than the fixed aspect ratio (the aspect ratio of the panel) of the projector, gaps are formed between the screen and the corrected shape of the video at the top and the bottom, and gaps are formed between the corrected shape of the video and the projection video on the right and the left, and therefore, the large gaps are formed on the right, left, top, and bottom of the projection video to thereby shrink the projection video.

In contrast, in the case in which the fixed aspect ratio (the aspect ratio of the panel) of the projector is vertically longer than the aspect ratio of the screen and the aspect ratio of the input video, large gaps are similarly formed on the right, left, top, and bottom of the projection video to thereby shrink the projection video.

Figure 6A:
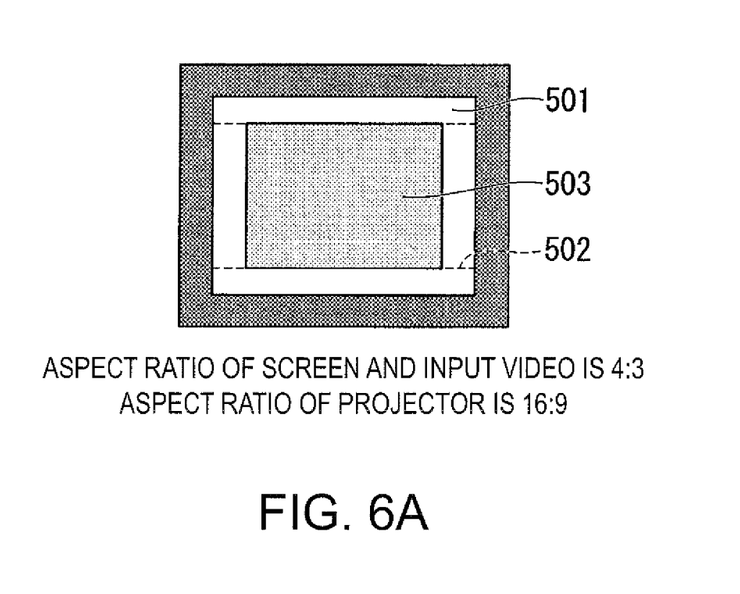
FIG. 6A is a diagram showing an appearance of the case in which the screen and the input video are vertically longer than the projector (the panel)

FIG. 6A is a diagram showing an appearance of the case in which the screen and the input video are vertically longer than the projector (panel). Such a case can occur in the case in which, for example, the user who owns the screen, the input video, and the projector as a set replaces the projector alone by purchase.

In this example, the aspect ratio of the screen and the aspect ratio of the input video are each 4:3 ((horizontal dimension):(vertical dimension)), and the aspect ratio of the projector is 16:9 ((horizontal dimension):(vertical dimension)).

FIG. 6A shows an example of a screen frame 501, a corrected shape 502 of a video, and a projection video 503. The gaps are formed on the right, left, top, and bottom of the projection video 503 with respect to the screen frame 501.

Figure 6B:
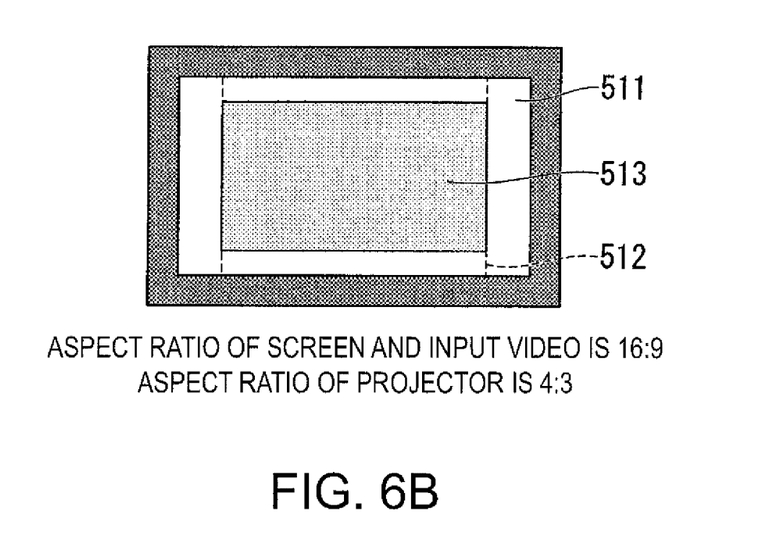
FIG. 6B is a diagram showing an appearance of the case in which the projector (the panel) is vertically longer than the screen and the input video.

FIG. 6B is a diagram showing an appearance of the case in which the projector (panel) is vertically longer than the screen and the input video. Such a case can occur in the case in which, for example, the user who owns the screen, the input video, and the projector as a set replaces the screen and the input video (a device for generating the input video) by purchase.

In this example, the aspect ratio of the screen and the aspect ratio of the input video are each 16:9 ((horizontal dimension):(vertical dimension)), and the aspect ratio of the projector is 4:3 ((horizontal dimension):(vertical dimension)).

FIG. 6B shows an example of a screen frame 511, a corrected shape 512 of a video, and a projection video 513. The gaps are formed on the right, left, top, and bottom of the projection video 513 with respect to the screen frame 511.

SUMMARY

An advantage of some aspects of the invention is to provide an image display device, an image display method, and an image display program each capable of realizing an effective corrected shape of an image.

An aspect of the invention is directed to an image display device including an image input section to which an image is input, an aspect ratio determination section adapted to determine an aspect ratio of the image input to the image input section, a correction section adapted to perform a correction on the image input to the image input section so that the image has an aspect ratio corresponding to an aspect ratio determined by the aspect ratio determination section, and a projection section adapted to project the image on which the correction is performed by the correction section.

According to this configuration, the aspect: ratio determination section determines the aspect ratio of the input image, and the correction section performs the correction on the input image so that the image has the aspect ratio corresponding to the aspect ratio of the input image thus determined. Therefore, it is possible for the image display device to generate the corrected shape having the aspect ratio corresponding to the aspect ratio of the input image, and thus realize the effective corrected shape of the image.

Another aspect of the invention is directed to the image display device according to the aspect of the invention described above, wherein the image display device further includes a pattern storage section adapted to store a pattern determined in advance, an image capturing section adapted to capture an image of the pattern, which is stored in the pattern storage section and projected by the projection section, and an image of a projection object, and an image analysis section adapted to detect a relative positional relationship between an image of a projection panel corresponding to the image of the pattern and the image of the projection object based on the images shot by the image capturing section, and the correction section performs the correction based on a result of the detection by the image analysis section.

According to this configuration, the image analysis section detects the relative positional relationship between the image of the projection panel corresponding to the image of the pattern determined in advance and the image o the projection object, and then the correction section performs the correction based on the detection result Therefore, it is possible for the image display device to generate the corrected shape based on the relative positional relationship between the image of the projection panel and the image of the projection object, and thus realize the effective corrected shape of the image.

Still another aspect of the invention is directed to the image display device according to the aspect of the invention described above, wherein the correction section performs the correction so that at least either one of a vertical dimension and a horizontal dimension of the image corrected becomes the largest with respect to a frame of the projection object.

According to this configuration, the correction section performs the correction so that at least either one of the vertical dimension and the horizontal dimension of the image thus corrected becomes the largest with respect to the frame of the projection object. Therefore, it is possible for the image display device to generate the corrected shape making the best use of the frame of the projection object, and thus realize the effective corrected shape of the image.

Yet another aspect of the invention is directed to the image display device according to the aspect of the invention described above, wherein the correction section includes a correction value calculation section adapted to calculate a correction value adapted to perform a distortion correction on the image input to the image input section so that the image has an aspect ratio equal to the aspect ratio determined by the aspect ratio determination section, and a distortion correction section adapted to perform the distortion correction on the image input to the image input section using the correction value calculated by the correction value calculation section.

According to this configuration, in the correction section, the correction value calculation section calculates the correction value, and the distortion correction section performs the distortion correction on the input image using the correction value thus calculated. Thus, the image display device is capable of realizing the effective corrected shape of the image.

Still yet another aspect of the invention is directed to the image display device according to the aspect of the invention described above, wherein the correction section includes a correction value calculation section adapted to calculate a correction value adapted to perform a distortion correction on the image input to the image input section for each of a plurality of aspect ratios different from each other so that the image has the aspect ratio, a correction value storage section adapted to store correction values respectively for the plurality of aspect ratios different from each other calculated by the correction value calculation section, a correction value selection section adapted to select the correction value out of the plurality of correction values stored in the correction value storage section in accordance with the aspect ratio determined by the aspect ratio determination section, and a distortion correction section adapted to perform the distortion correction on the image input to the image input section using the correction value selected by the correction value selection section.

According to this configuration, in the correction section, the correction value calculation section calculates the correction value for each of the plurality of aspect ratios different from each other, the correction value storage section stores the correction values respectively for the plurality of aspect ratios different from each other thus calculated, the correction value selection section selects the correction value in accordance with the aspect ratio of the input image out of the plurality of correction values thus stored, and the distortion correction section performs the distortion correction on the input image using the correction value thus selected. Thus, the image display device is capable of realizing the effective corrected shape of the image.

Further another aspect of the invention is directed to the image display device according to the aspect of the invention described above, wherein the correction value selection section selects one of the correction value corresponding to an aspect ratio equal to the aspect ratio determined by the aspect ratio determination section and the correction value corresponding to the aspect ratio having a difference from the aspect ratio determined by the aspect ratio determination section within a range determined in advance out of the plurality of correction values stored in the correction value storage section, and selects a correction value determined in advance in a case in which there is no correction value to be selected in accordance with the aspect ratio determined by the aspect ratio determination section.

According to this configuration, the correction value selection section selects the correction value corresponding to the aspect ratio equal to or approximate to the aspect ratio of the input image out of the plurality of correction values, and further, selects the correction value determined in advance in the case in which there is no correction value to be selected in accordance with the aspect ratio of the input image. Thus, the image display device can realize the effective corrected shape of the image in accordance with the aspect ratio of the input image, and further, cope with the case in which there is no correction value corresponding to the aspect ratio of the input image.

Still further another aspect of the invention is directed to an image display method including: determining, by an aspect ratio determination section, an aspect ratio of an image input to an image input section, performing, by a correction section, a correction on the image input to the image input section so that the image has an aspect ratio corresponding to an aspect ratio determined by an aspect ratio determination section, and projecting, by a projection section, the image on which the correction is performed by the correction section.

According to this method, the aspect ratio determination section determines the aspect ratio of the input image, and the correction section performs the correction on the input image so that the image has the aspect ratio corresponding to the aspect ratio of the input image thus determined. Therefore, it is possible for the image display device to generate the corrected shape having the aspect ratio corresponding to the aspect ratio of the input image, and thus realize the effective corrected shape of the image.

Yet further another aspect of the invention is directed to an image display program which allows a computer to execute the procedure including: determining, by an aspect ratio determination section, an aspect ratio of an image input to an image input section, performing, by a correction section, a correction on the image input to the image input section so that the image has an aspect ratio corresponding to an aspect ratio determined by an aspect ratio determination section, and projecting, by a projection section, the image on which the correction is performed by the correction section.

According to this program, the aspect ratio determination section determines the aspect ratio of the input image, and the correction section performs the correction on the input image so that the image has the aspect ratio corresponding to the aspect ratio of the input image thus determined. Therefore, it is possible for the image display device to generate the corrected shape having the aspect ratio corresponding to the aspect ratio of the input image, and thus realize the effective corrected shape of the image.

As described above, according to the aspects of the invention, the image display device determines the aspect ratio of the input image with the aspect ratio determination section, and performs the correction on the input image so that the image has the aspect ratio corresponding to the aspect ratio of the input image thus determined with the correction section. Therefore, it is possible for the image display device to generate the corrected shape having the aspect ratio corresponding to the aspect ratio of the input image, and thus realize the effective corrected shape of the image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some embodiments of the invention will be described in detail with reference to the accompanying drawings.

It should be noted that in the present specification, the term "image" and the term "video," are used and "video" is an example of "image," and mainly denotes a moving image. Further, a process of a moving image (video) and a process of a still image (an image frame of the moving image) constituting the moving image (the video) can be replaced with each other if the replacement is possible.

In the embodiment described below, although a projector for inputting and then projecting a "video" is explained as an example, the embodiment can also be applied to, for example, a projector for inputting and then projecting a still image.

First Embodiment

Figure 1:
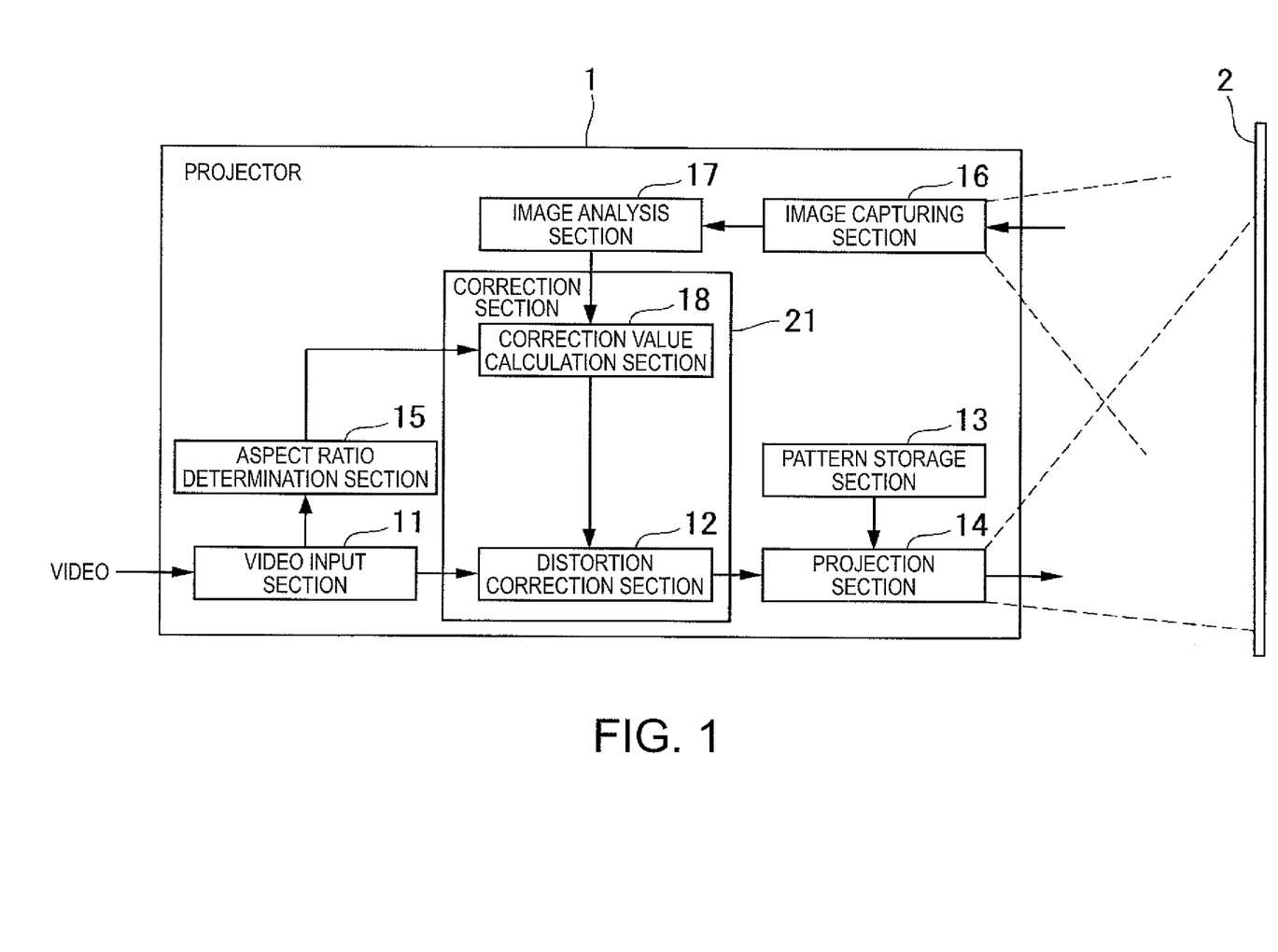
FIG. 1 is a block diagram showing a schematic configuration example of an image processing system according to an embodiment (a first embodiment) of the invention.

FIG. 1 is a block diagram showing a schematic configuration example of an image processing system according to an embodiment of the invention.

The image processing system according to the present embodiment is provided with a projector 1, and a screen 2, which is an example of a projection object. A surface of the screen 2 facing to the projector 1 forms a projection surface for a video.

The projector 1 is provided with a video input section 11, a distortion correction section 12, a pattern storage section 13, a projection section 14, an aspect ratio determination section 15, an image capturing section 16, an image analysis section 17, and a correction value calculation section 18.

In the present embodiment, a correction section 21 is configured including the correction value calculation section 18, and the distortion correction section 12.

An example of an operation performed in the projector 1 according to the present embodiment will be described.

The video input section 11 has a video to be a projection target input from an external device, and then outputs the video (the input video) to the distortion correction section 12 and the aspect ratio determination section 15. The video input section 11 is configured using an analog-to-digital (A/D) converter for converting an analog video signal input thereto into a digital video signal, and then outputs the digital video signal.

Here, as the external device acting as a source for inputting the video to the video input section 11, there can be used a variety of devices such as an image capturing device (a camera) for capturing and then outputting a video, a video reproduction device or a personal computer (PC) for reproducing and then outputting a video, or a video storage device (a storage medium) for storing a video and outputting the video.

The distortion correction section 12 performs a correction (a distortion correction) on the input video input from the video input section 11 using a correction value input from the correction value calculation section 18, and then outputs the video thus corrected to the projection section 14. The distortion correction section 12 is configured using, for example, an image processor.

Here, the content of the correction process performed by the distortion correction section 12 on the input video is determined in advance except the point that, for example, the correction value input from the correction value calculation section 18 is used as a parameter. As the correction process, for example, a variety of known technologies using a geometric calculation can be used. As a specific example, there can be used a process of calculating positions (e.g., the positions of the coordinates of four corners of a rectangle) of a corrected shape of a video using a conversion value or a conversion equation, which is based on the correction value input from the correction value calculation section 18, on positions (e.g., the positions of the coordinates of four corners of a rectangle) of an input video.

As the conversion value, a value for performing multiplication (or other operations) for converting the positions of the input video into the positions of the corrected shape of the video can be used, for example. In the present embodiment, the conversion value is determined using the correction value input from the correction value calculation section 18 as a parameter.

Further, as the conversion equation, a formula for converting the positions of the input video into the positions of the corrected shape of the video can be used. In the present embodiment, the conversion equation is determined using the correction value input from the correction value calculation section 18 as a parameter.

It should be noted that such a conversion value or such a conversion equation can be common to the entire video to be the conversion target, or can be different between portions of the video to be the conversion target.

The pattern storage section 13 stores a video of a pattern (a measurement pattern) determined in advance. The pattern storage section 13 is configured using, for example, a read-only memory (ROM) for storing information of the video.

Here, as the video of the measurement pattern, a variety of videos can be used, and as an example, a solid white video can be used, and as another example, a solid white video including predetermined portions with colors other than white can be used.

The projection section 14 has a function of switching the projection target between the video thus corrected input from the distortion correction section 12 and the video of the measurement pattern read out from the pattern storage section 13, and projects the video thus switched to be the projection target. In the present embodiment, the video projected by the projection section 14 is projected on the projection surface of the screen 2 (a part of the video not included in the projection surface of the screen 2 is projected on the periphery of the projection surface of the screen 2). The projection section 14 is configured using, for example, a panel (e.g., a projection panel such as a liquid crystal panel), a lamp (a light source), and a lens. The panel (a modulation device) can be, for example, a DMD.

Further, in the case of switching the video of the measurement pattern read out from the pattern storage section 13 to be the projection target and then projecting the video of the measurement pattern, the projection section 14 projects the video of the measurement pattern on the entire surface of the panel. Thus, the video of the measurement pattern to be projected coincides with the image of the panel.

The image capturing section 16 captures the projection surface of the screen 2 and the video, which is projected on the projection surface of the screen 2, and then outputs the video thus shot to the image analysis section 17. The image capturing section 16 is configured using, for example, an image capturing device (a camera) for capturing the video using an image sensor and so on, and then outputting the video thus shot.

Here, in the present embodiment, the image capturing section 16 captures, for example, the projection surface of the screen 2 and the video of the measurement pattern projected to the projection surface of the screen 2 by the projection section 14.

The image analysis section 17 analyzes the video (e.g., the still image constituting the video) shot by and input from the image capturing section 16, then detects the measurement pattern (video (e.g., the still image constituting the video) of the measurement pattern) shown in the video, then detects a frame (a screen frame) of the projection surface of the screen 2 shown in the video, and then outputs the information of the result of such detection to the correction value calculation section 18. It should be noted that the image analysis section 17 can also detect other objects determined in advance, based on the video thus shot if needed. The image analysis section 17 is configured using, for example, a central processing unit (CPU).

It should be noted that although in the present embodiment, the configuration of capturing the video by the image capturing section 16 is adopted, a configuration of capturing the still image by the image capturing section 16, then outputting the still image thus shot to the image analysis section 17, and then analyzing the still image by the image analysis section 17 can be used as another configuration example.

According to such a process as described above, the image analysis section 17 can detect the relationship of the relative position between the image of the panel and the image of the screen frame with respect to the panel of the projector 1 (the panel of the projection section 14) corresponding to the measurement pattern and the screen frame, and thus detect, for example, the position where the image of the screen frame exists in the image of the panel. As a specific example, the image analysis section 17 can detect the relative relationship between the positions of the four corners of the image of the panel and the positions of the four corners of the image of the screen frame.

Here, it is also possible to adopt a configuration of, for example, providing the projector 1 with a zoom function, and adjusting such a zoom function to thereby make it possible to vary the relative position and size of the image of the screen frame to the image of the panel. As a specific example, by adjusting the zoom function, it is possible to make the image of the screen frame larger or smaller relatively to the image of the panel.

It should be noted that such an adjustment of the zoom function can automatically be performed by, for example, the device (the projector 1 in this example), or can manually be performed by the user.

Further, the zoom function can be provided to, for example, the projection section 14, or the distortion correction section 12.

The aspect ratio determination section 15 determines the aspect ratio (=(length of the vertical side)/(length of the horizontal side); described also as the ratio of (horizontal dimension):(vertical dimension) in the present specification), which is the aspect ratio of the input video input from the video input section 11, and then outputs the information of the determination result to the correction value calculation section 18. The aspect ratio determination section 15 is configured using, for example, a CPU.

The correction value calculation section 18 calculates a correction value (a distortion correction value) to be used in the process of correcting the distortion with respect to the input video performed in the distortion correction section 12, based on the information of the detection result (the detection result of the measurement pattern and the screen frame) input from the image analysis section 17 and the information of the determination result of the aspect ration input from the aspect ration determination section 15, and then outputs the correction value thus calculated to the distortion correction section 12. The correction value calculation section 18 is configured using, for example, a CPU.

In the present embodiment, the correction value calculation section 18 calculates the correction value of the distortion correction in accordance with the aspect ratio of the input video, and specifically, calculates the correction value for generating the corrected shape having an aspect ratio equal to (coinciding with) the aspect ratio of the input video, for example.

Further, as a more preferable configuration, the correction value calculation section 18 calculates the correction value for generating the corrected shape, which fits into the screen frame and is as large as possible, and specifically, calculates the correction value for generating the corrected shape, which has the same aspect ratio as the aspect ratio of the input video, and one of the vertical length and the horizontal length of which is equal to the corresponding length (the one of the vertical length and the horizontal length) of the screen frame, and the other of the vertical length and the horizontal length of which is equal to or smaller than the corresponding length (the other of the vertical length and the horizontal length) of the screen frame, for example.

It should be noted that a corrected shape having an aspect ratio similar to the aspect ratio of the input video can be used instead of the corrected shape having the same aspect ratio as the aspect ratio of the input video, and for example, the corrected shape having an aspect ratio different from the aspect ratio of the input video within a predetermined range (e.g., a small range) or by a predetermined value (e.g., a small value) can also be used.

As an example, firstly, the aspect ratio determination section 15 determines the aspect ratio of the input video input to the video input section 11, then the correction value calculation section 18 calculates the correction value by performing substantially the same process as in the known technology (an arbitrary technology for calculating the correction value of the distortion correction based on the aspect ration to be the target of the corrected shape) as the subsequent process using the aspect ratio thus determined as the aspect ratio to be the target of the corrected shape.

Further, a configuration in which the vertical length or the horizontal length of the corrected shape is similar to the corresponding length (the vertical length or the horizontal length) of the screen frame can be used instead of the configuration in which the vertical length or the horizontal length of the corrected shape is equal to the corresponding length (the vertical length or the horizontal length) of the screen frame, and for example, a configuration in which the vertical length or the horizontal length of the corrected shape is different from the corresponding length (the vertical length or the horizontal length) of the screen frame within a predetermined range (e.g., a small range) or by a predetermined value (e.g., a small value) can be used.

Further, the correction value calculation section 18 is provided with a storage section (e.g., a memory) for storing the correction value thus calculated. It should be noted that as another configuration example, such a storage section can be disposed between the correction value calculation section 18 and the distortion correction section 12, and in this case, the correction value calculated by the correction value calculation section 18 is stored in the storage section, and then the distortion correction section 12 reads out and then use the correction value stored in the storage section.

By providing such a storage section, it becomes possible for the distortion correction section 12 to use the correction value, which has been calculated by the correction value calculation section 18, a plurality of times in a repeated manner.

Here, in the present embodiment, the image analysis section 17, the aspect ratio determination section 15, and the correction value calculation section 18 can be configured using the common CPU. Further, in the present embodiment, it is also possible to realize the function of the control section for performing control of the overall process in the projector 1 using such a CPU.

Figure 2:
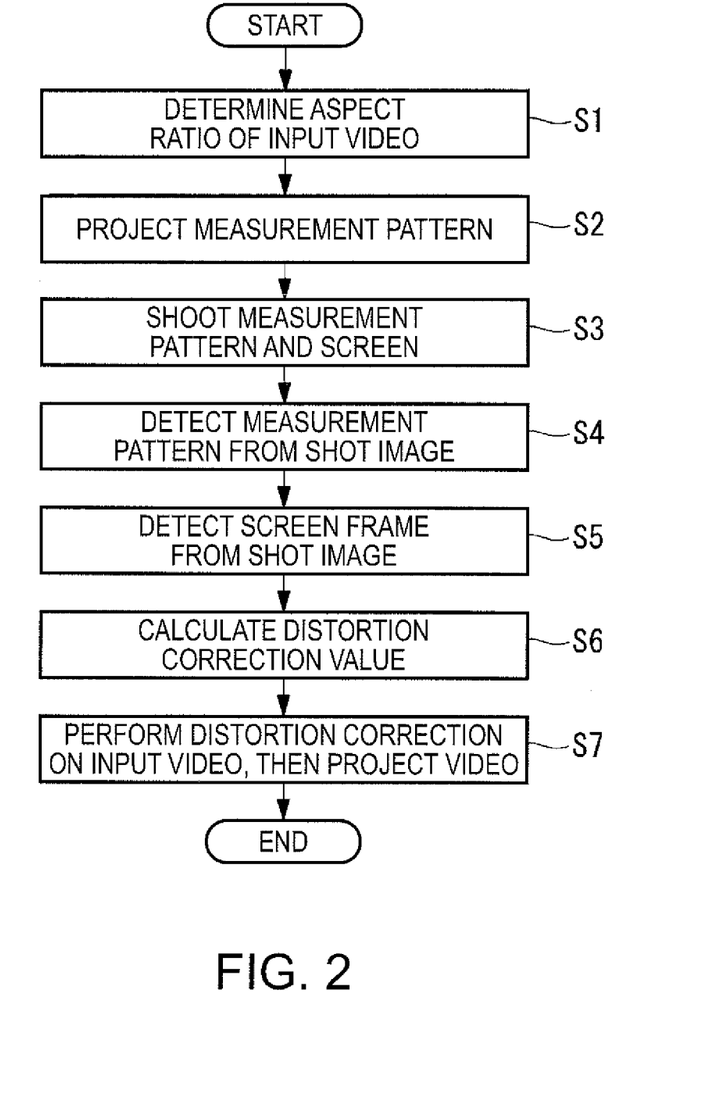
FIG. 2 is a diagram showing an example of a procedure of a process performed by a projector according to the embodiment (the first embodiment) of the invention.

FIG. 2 is a diagram showing an example of a procedure of a process (a process of an automatic screen frame correction) performed by the projector 1 according to the present embodiment of the invention.

It should be rioted that the procedure of the process described in this example is illustrative only, and it is also possible to use other procedures of the sequence of the process providing substantially the same result can be obtained.

In the projector 1, the aspect ratio determination section 15 determines (step S1) the aspect ratio of the input video input from the video input section 11.

Further, the projection section 14 projects (step S2) the video of the measurement pattern stored in the pattern storage section 13.

The image capturing section 16 captures (step S3) the measurement pattern thus projected and the projection surface of the screen 2.

The image analysis section 17 detects (step S4) the measurement pattern, and then detects (step S5) the screen frame based on the shot video (the shot image).

The correction value calculation section 18 calculates (step S6) the correction value (the distortion correction value) for the distortion correction based on the aspect ratio determined by the aspect ratio determination section 15, and the measurement pattern and the screen frame detected by the image analysis section 17.

The projection section 14 performs switching so as to set the video thus corrected and input from the distortion correction section 12 to the projection target, and then projects (step S7) the video thus corrected. Thus, the input video thus corrected is projected on the projection surface of the screen 2.

The content of the process of the correction (the distortion correction) performed by the distortion correction section 12 will be explained with reference to FIGS. 3A through 3D.

In these examples, the case in which the aspect ratio of the screen 2 is in between 4:3 ((horizontal dimension):(vertical dimension)) and 16:10 ((horizontal dimension):(vertical dimension)) is shown, and the corrected shape is determined in accordance with the aspect ratio of the input video.

Further, in these examples, the relative positional relationship between the panel (the image thereof) 101 and the screen frame (the image in the plane corresponding to the image of the panel 101) 102 is the same, and the corrected shapes (the images in the plane corresponding to the image of the panel 101 and the image of the screen frame 102) ill through 114 of the video are different in accordance with the aspect ratio of the input video.

Figure 3A:
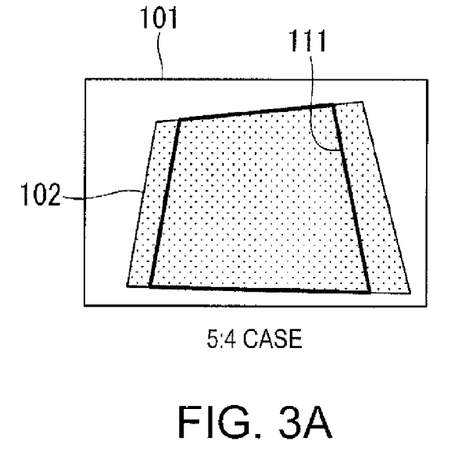
FIG. 3A is a diagram showing an appearance of the case in which the aspect ratio of the corrected shape of the video is 5:4 ((horizontal dimension):(vertical dimension))

FIG. 3A is a diagram showing an appearance of the case in which the aspect ratio of the corrected shape of the video is 5:4 ((horizontal dimension):(vertical dimension)). The present embodiment corresponds to the case in which the aspect ratio of the input video is 5:4 ((horizontal dimension):(vertical dimension)).

FIG. 3A shows the panel (the image thereof) 101, the screen frame (the image in the plane corresponding to the image of the panel 101) 102, and the corrected shape (the image in the plane corresponding to the image of the panel 101 and the image of the screen frame 102) 111 of the video realized by the correction value of the distortion correction. Thus, there is shown the relationship between the position (the coordinate) of the screen frame 102 fitted in the surface of the panel 101 and the position (the coordinate) of the corrected shape 111 fitted in the screen frame 102 on the coordinate system based on the panel 101.

In this example, the size in the vertical direction (the upper side and the lower side) of the corrected shape 111 coincides with that of the screen frame 102, and the size in the horizontal direction (the lift side and the right side) of the corrected shape 111 is smaller (narrower) than that of the screen frame 102.

Figure 3B:
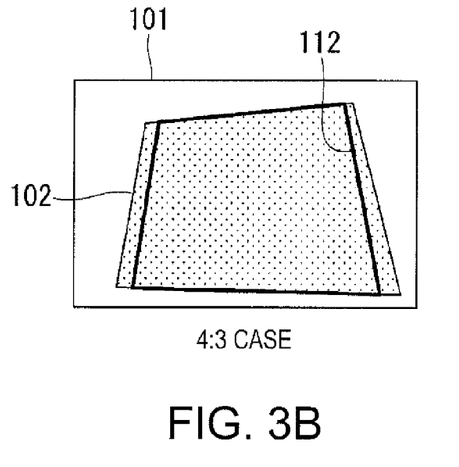
FIG. 3B is a diagram showing an appearance of the case in which the aspect ratio of the corrected shape of the video is 4:3 ((horizontal dimension):(vertical dimension))

FIG. 3B is a diagram showing an appearance of the case in which the aspect ratio of the corrected shape of the video is 4:3 ((horizontal dimension):(vertical dimension)). The present embodiment corresponds to the case in which the aspect ratio of the input video is 4:3 ((horizontal dimension):(vertical dimension)).

FIG. 3B shows the panel (the image thereof) 101, the screen frame (the image in the plane corresponding to the image of the panel 101) 102, and the corrected shape (the image in the plane corresponding to the image of the panel 101 and the image of the screen frame 102) 112 of the video realized by the correction value of the distortion correction. Thus, there is shown the relationship between the position (the coordinate) of the screen frame 102 fitted in the surface of the panel 101 and the position (the coordinate) of the corrected shape 112 fitted in the screen frame 102 on the coordinate system based on the panel 101.

In this example, the size in the vertical direction (the upper side and the lower side) of the corrected shape 112 coincides with that of the screen frame 102, and the size in the horizontal direction (the left side and the right side) of the corrected shape 112 is smaller (narrower) than that of the screen frame 102.

Figure 3C:
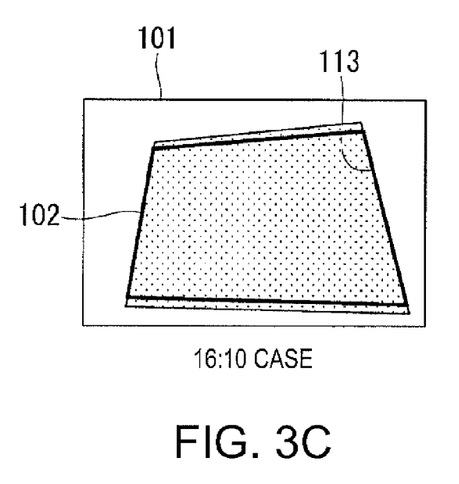
FIG. 3C is a diagram showing an appearance of the case in which the aspect ratio of the corrected shape of the video is 16:10 ((horizontal dimension):(vertical dimension))

FIG. 3C is a diagram showing an appearance of the case in which the aspect ratio of the corrected shape of the video is 16:10 ((horizontal dimension):(vertical dimension)) The present embodiment corresponds to the case in which the aspect ratio of the input video is 16:10 ((horizontal dimension):(vertical dimension)).

FIG. 3C shows the panel (the image thereof) 101, the screen frame (the image in the plane corresponding to the image of the panel 101) 102, and the corrected shape (the image in the plane corresponding to the image of the panel 101 and the image of the screen frame 102) 113 of the video realized by the correction value of the distortion correction. Thus, there is shown the relationship between the position (the coordinate) of the screen frame 102 fitted in the surface of the panel 101 and the position (the coordinate) of the corrected shape 113 fitted in the screen frame 102 on the coordinate system based on the panel 101.

In this example, the size in the horizontal direction (the left side and the right side) of the corrected shape 113 coincides with that of the screen frame 102, and the size in the vertical direction (the upper side and the lower side) of the corrected shape 113 is smaller (narrower) than that of the screen frame 102.

Figure 3D:
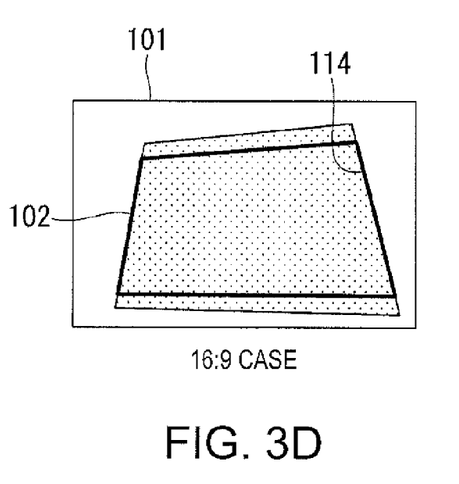
FIG. 3D is a diagram showing an appearance of the case in which the aspect ratio of the corrected shape of the video is 16:9 ((horizontal dimension):(vertical dimension)).

FIG. 3D is a diagram showing an appearance of the case in which the aspect ratio of the corrected shape of the video is 16:9 ((horizontal dimension):(vertical dimension)) The present embodiment corresponds to the case in which the aspect ratio of the input video is 16:9 ((horizontal dimension):(vertical dimension)).

FIG. 3D shows the panel (the image thereof) 101, the screen frame (the image in the plane corresponding to the image of the panel 101) 102, and the corrected shape (the image in the plane corresponding to the image of the panel 101 and the image of the screen frame 102) 114 of the video realized by the correction value of the distortion correction. Thus, there is shown the relationship between the position (the coordinate) of the screen frame 102 fitted in the surface of the panel 101 and the position (the coordinate) of the corrected shape 114 fitted in the screen frame 102 on the coordinate system based on the panel 101.

In this example, the size in the horizontal direction (the left side and the right side) of the corrected shape 114 coincides with that of the screen frame 102, and the size in the vertical direction (the upper side and the lower side) of the corrected shape 114 is smaller (narrower) than that of the screen frame 102.

By performing the distortion correction on the input video in accordance with the corrected shapes 111 through 114 shown in FIGS. 3A through 3D, it is possible to display the video with the largest possible size with respect to the screen 2 while keeping the aspect ratio of the input video.

As described above, in the projector 1 in the image processing system according to the present embodiment, the aspect ratio to be the target of the corrected shape of the video is not fixed, but is set to the aspect ratio of the input video at the moment when the distortion correction is performed.

Therefore, according to the projector 1 related to the present embodiment, the video can be projected while keeping the aspect ratio of the input video.

Further, besides the above, according to the projector 1 related to the present embodiment, by generating the corrected shape for projecting the video with the largest allowable size for fitting into the screen 2 while keeping the aspect ratio of the input video, it is possible to project the video with the largest allowable size for fitting into the screen 2 while keeping the aspect ratio of the input video.

As described above, according to the projector 1 related to the present embodiment, the effective corrected shape of the image can be realized.

Here, once the projector 1 according to the present embodiment is installed, for example, the projector 1 is used for a certain period of time in, for example, a meeting with the installation position fixed. On this occasion, in the projector 1 according to the present embodiment, in the case in which the input video is switched, for example, by a user operation or automatically by the device, and the aspect ratio of the input video is changed, the aspect ratio determination section 15 determines the aspect ratio of the input video at the present moment, and the correction value calculation section 18 calculates the correction value in accordance with the determination result. As described above, according to the projector 1 related to the present embodiment, it is also possible to recalculate the correction value every time the aspect ratio of the input video is changed. It should be noted that in such a case, if the installation positions of the projector 1 and the screen 2 are fixed, it is sufficient for the process (the process of detecting the relative positional relationship between the panel and the screen frame) of projecting the measurement pattern to be performed once at the beginning, and the detection result in the first turn of the process can be used in the subsequent process.

As a configuration example, the image display device (the projector 1 in the present embodiment) is provided with an image input section (the video input section 11 in the present embodiment) to which the image (the video in the present embodiment) is input, the aspect ratio determination section 15 for determining the aspect ratio of the image input to the image input section, a correction section (the correction value calculation section 18 and the distortion correction section 12 in the present embodiment) for performing the correction on the image input to the image input section so that the image has an aspect ratio corresponding to the aspect ratio determined by the aspect ratio determination section 15, and the projection section 14 for projecting the image on which the correction is performed by the correction section.

As a configuration example, the image display device is provided with a pattern storage section 13 for storing a pattern (the measurement pattern in the present embodiment) determined in advance, the image capturing section 16 for capturing the image of the pattern stored in the pattern storage section 13 and projected by the projection section 14 and the image of the projection object (the screen 2 in the present embodiment), and the image analysis section 17 for detecting the relative positional relationship between the image of the projection panel corresponding to the image of the pattern and the image of the projection object based on the image shot by the image capturing section 16, and the correction section performs the correction based on the result of the detection by the image analysis section 17.

As a configuration example, in the image display device, the correction section performs the correction so that at least either one of the vertical dimension and the horizontal dimension of the image thus corrected becomes the largest with respect to the frame of the projection object.

As a configuration example, in the image display device, the correction section includes the correction value calculation section 18 for calculating the correction value for performing the distortion correction on the image input to the image input section so that the image has the same aspect ratio as the aspect ratio determined by the aspect ratio determination section 15, and the distortion correction section 12 for performing the distortion correction on the image input to the image input section using the correction value calculated by the correction value calculation section 18.

Second Embodiment

Figure 4:
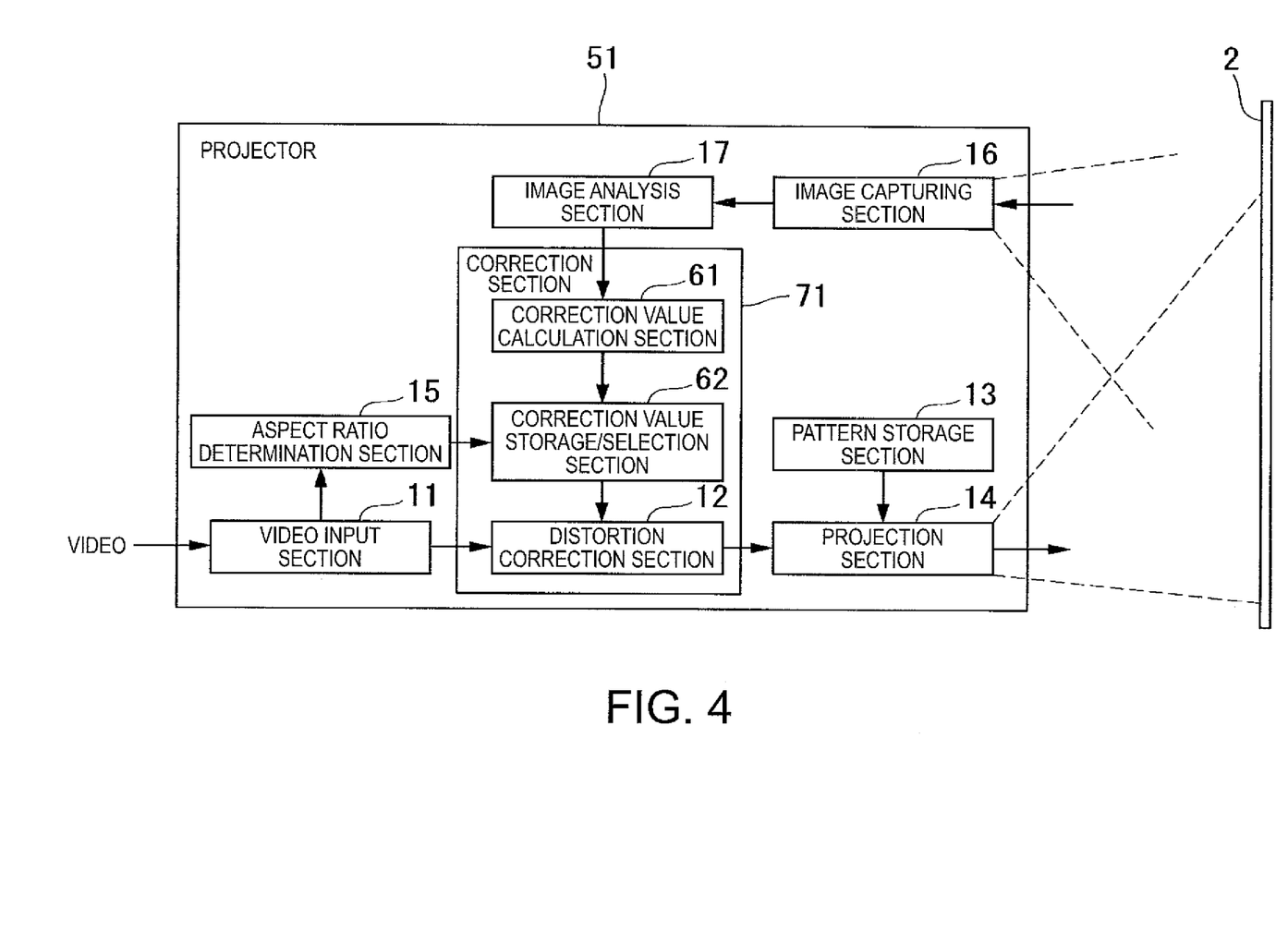
FIG. 4 is a block diagram showing a schematic configuration example of an image processing system according to an embodiment (a second embodiment) of the invention.

FIG. 4 is a block diagram showing a schematic configuration example of an image processing system according to an embodiment of the invention.

In the description of the present embodiment, the point in which the present embodiment is different from the first embodiment will mainly be explained, and constituents substantially the same as those in the case of the first embodiment will be denoted with the same symbols.

The image processing system according to the present embodiment is provided with a projector 51, and a screen 2. A surface of the screen 2 facing to the projector 51 forms a projection surface for a video.

The projector 51 is provided with a video input section 11, a distortion correction section 12, a pattern storage section 13, a projection section 14, an aspect ratio determination section 15, an image capturing section 16, an image analysis section 17, a correction value calculation section 61, and a correction value storage/selection section 62.

In the present embodiment, a correction section 71 is configured including the correction value calculation section 61, the correction value storage/selection section 62, and the distortion correction section 12.

An example of an operation performed in the projector 51 according to the present embodiment will be described.

In the description of the present embodiment, as the point in which the present embodiment is different from the first embodiment, an operation of the correction value calculation section 61 and the correction value storage/selection section 62 will be explained.

It should be noted that although the operation performed by the video input section 11, the distortion correction section 12, the pattern storage section 13, the projection section 14, the aspect ratio determination section 15, the image capturing section 16, and the image analysis section 17 is substantially the same as in the case of the first embodiment, in the present embodiment, the image analysis section 17 outputs the information (the information of the measurement pattern and the screen frame) of the detection result to the correction value calculation section 61, and the aspect ratio determination section 15 outputs the information (the information of the aspect ratio of the input video) of the determination result to the correction value storage/selection section 62.

Based on the information of the detection result (the detection result of the measurement pattern and the screen frame) input from the image analysis section 17 and the information of a plurality of types of aspect ratios (a plurality of aspect ratios different from each other) determined in advance or designated by a user operation, the correction value calculation section 61 calculates a correction value (a distortion correction value) to be used in the process of correcting the distortion with respect to the input video performed in the distortion correction section 12 for each of the plurality of types of aspect ratios assuming that each of the aspect ratios is the aspect ratio of the input video, and then outputs the correction values thus calculated to the correction value storage/selection section 62.

It should be noted that the correction value calculation section 61 is substantially the same as that in the case of the first embodiment in, for example, the method of calculating the correction value except the point of calculating the correction values respectively for the plurality of types of aspect ratios described above (instead of the aspect ratio of the actual input video).

Further, in the case in which the plurality of types of aspect ratios described above is determined in advance, the information thereof is stored in a storage section (e.g., a memory) in, for example, the correction value calculation section 61, and is then used by the correction value calculation section 61.

Here, as the number of types of aspect ratios, an arbitrary number equal to or greater than two can be used.

Further, as the value of each of the plurality of types of aspect ratios described above, a variety of values can be used. For example, values planned or expected to be used as the aspect ratio of the input video can be used.

As an example, the aspect ratios of 5:4 ((horizontal dimension):(vertical dimension)), 4:3 ((horizontal dimension):(vertical dimension)) 16:10 ((horizontal dimension):(vertical dimension)), 16:9 ((horizontal dimension):(vertical dimension)), and so on can be used as the plurality of types of aspect ratios described above.

The correction value storage/selection section 62 is provided with a function of a storage section (e.g., a memory) of the correction value, and a function of a selection section of the correction value.

The storage section (a correction value storage section) of the correction value storage/selection section 62 stores the correction value calculated by the correction value calculation section 61 so as to correspond to the aspect ratio for each of the plurality of types of aspect ratios described above. The storage section of the correction value storage/selection section 62 is configured using, for example, a random access memory (RAM).

Based on the information of the determination result of the aspect ratio input from the aspect ratio determination section 15, the selection section (a correction value selection section) of the correction value storage/selection section 62 selects the correction value corresponding to one aspect ratio out of the correction values corresponding respectively to the plurality of types of aspect ratios stored in the storage section of the correction value storage/selection section 62 in accordance with the aspect ratio of the input video, and then outputs the correction value thus selected to the distortion correction section 12. Thus, the distortion correction section 12 performs the distortion correction on the input video using the correction value input from the correction value storage/selection section 62 as the correction value for the distortion correction.

Here, as the method of selecting the correction value corresponding to the one aspect ratio out of the correction values corresponding respectively to the plurality of types of aspect ratios stored in the storage section of the correction value storage/selection section 62 in accordance with the aspect ratio of the input video performed by the correction value storage/selection section 62, a variety of methods can be used. For example, it is possible to select the correction value corresponding to the aspect ratio, which is the most approximate to (or can be the same as) the aspect ratio of the input video out of the plurality of types of aspect ratios described above.

Further, as another configuration example of the method of selecting the correction value corresponding to the one aspect ratio out of the correction values corresponding respectively to the plurality of types of aspect ratios stored in the storage section of the correction value storage/selection section 62 in accordance with the aspect ratio of the input video performed by the correction value storage/selection section 62, it is possible to select, for example, the correction value corresponding to the aspect ratio, which has a difference from the aspect ratio of the input video within a range determined in advance out of the plurality of types of aspect ratios described above. In this case, if two or more such aspect ratios exist, the correction value corresponding to the aspect ratio, which is the most approximate to (or can be the same as) the aspect ratio of the input video can be selected. In such a configuration, in the case in which, for example, there is no aspect ratio having the difference from the aspect ratio of the input video within the range determined in advance out of the plurality of types of aspect ratios, the selection section of the correction value storage/select section 62 can select the correction value corresponding to the aspect ratio (not necessarily required to correspond to the aspect ratio of the input video) determined in advance to be used in this case. As such an aspect ratio determined in advance, for example, such a fixed aspect ratio (e.g., the aspect ratio of the panel of the projection section 14 of the projector 51) as used in the related art can be used, and the correction value corresponding to the fixed aspect ratio is stored in the storage section of the correction value storage/selection section 62 and then selected by the selection section thereof.

Figure 5:
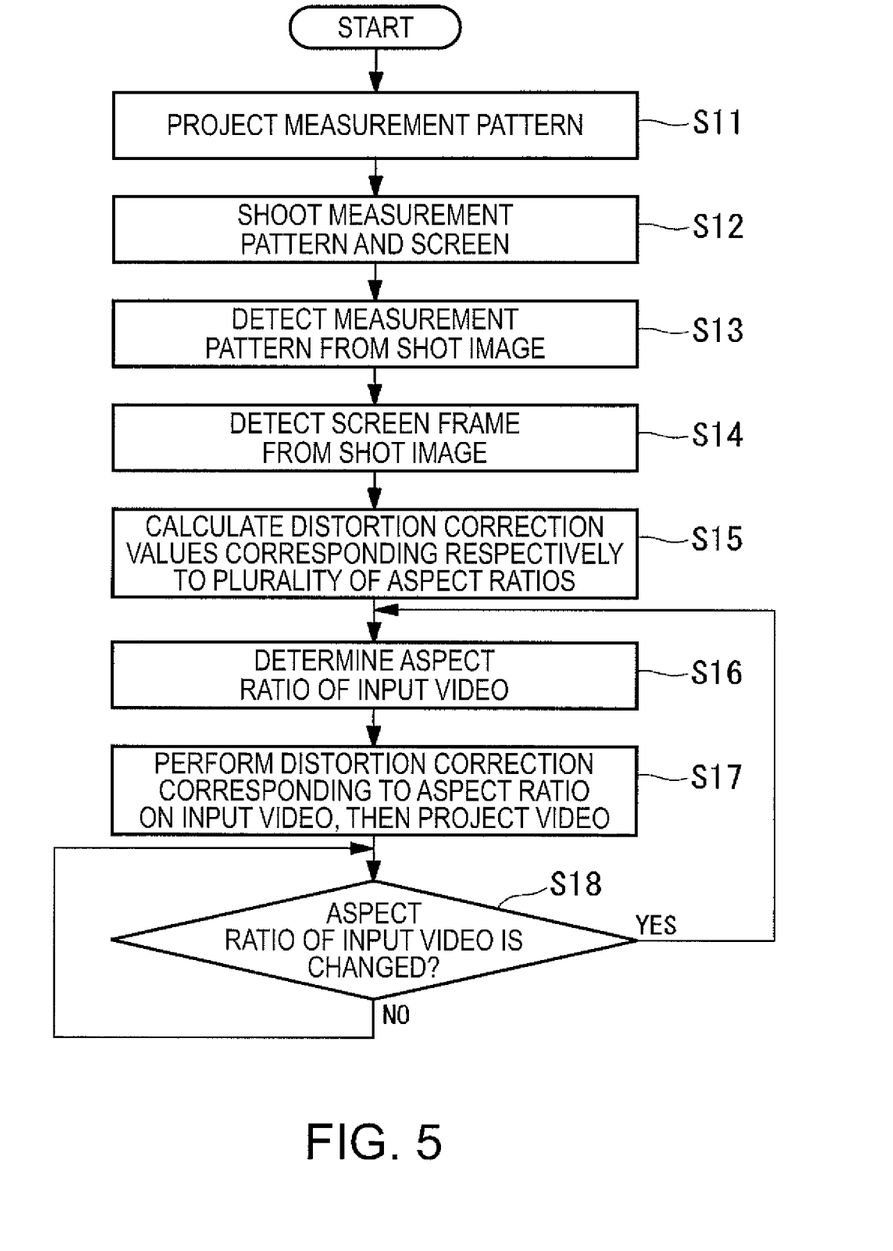
FIG. 5 is a diagram showing an example of a procedure of a process performed by a projector according to the embodiment (the second embodiment) of the invention.

FIG. 5 is a diagram showing an example of a procedure of a process (a process of an automatic screen frame correction) performed by the projector 51 according to the present embodiment of the invention.

It should be noted that the procedure of the process described in this example is illustrative only, and it is also possible to use other procedures of the sequence of the process providing substantially the same result can be obtained.

In the projector 51, the projection section 14 projects (step S11) the video of the measurement pattern stored in the pattern storage section 13.

The image capturing section 16 captures (step S12) the measurement pattern thus projected and the projection surface of the screen 2.

The image analysis section 17 detects (step S13) the measurement pattern, and then detects (step S14) the screen frame based on the shot video (the shot image).

The correction value calculation section 61 calculates (step S15) the correction value (the distortion correction value) for the distortion correction in accordance with each of the plurality of aspect ratios based on the measurement pattern and the screen frame detected by the image analysis section 17. The correction values corresponding respectively to the plurality of aspect ratios are stored in the storage section of the correction value storage/selection section 62.

Here, the process of the steps S11 through S15 up until the present point can be performed in the case in which the video is input to the video input section 11, or can be performed in the case in which the video is not input to the video input section 11.

Subsequently, in the case in which the video is input to the video input section 11, the aspect ratio determination section 15 determines (step S16) the aspect ratio of the input video input from the video input section 11.

The selection section of the correction value storage/selection section 62 selects and reads out the correction value corresponding to the aspect ratio of the input video determined by the aspect ratio determination section 15 out of the correction values stored in the storage section of the correction value storage/selection section 62, and then outputs the correction value thus read out to the distortion correction section 12. The distortion correction section 12 performs the distortion correction on the input video using the correction value input from the correction value storage/selection section 62 as the correction value for the distortion correction. Then, the projection section 14 projects (step S17) the video thus corrected and input from the distortion correction section 12. Thus, the input video thus corrected is projected on the projection surface of the screen 2.

Here, in the case of projecting the input video on which the distortion correction has been performed in the state in which switching is performed so that the video of the measurement pattern stored in the pattern storage section 13 is set to the projection target, the projection section 14 performs switching so that the video thus corrected and input from the distortion correction section 12 is set to the projection target.

Subsequently, the aspect ratio determination section 15 determines (step S18) whether or not the aspect ratio of the input video is changed, and if it is determined that the aspect ratio of the input video is not changed, the projection of the input video on which the distortion correction has been performed is continued without modification, and if it is determined that the aspect ratio of the input video is changed on the other hand, the process proceeds to the process of the step S16, and the distortion correction using the correction value corresponding to the aspect ratio of the input video after the change, and the projection of the input video on which the distortion correction is performed are performed (steps S16 through S17).

As described above, in the projector 51 in the image processing system according to the present embodiment, the aspect ratio to be the target of the corrected shape of the video is not fixed, but is set to the aspect ratio of the input video at the moment when the distortion correction is performed.

Therefore, according to the projector 51 related to the present embodiment, the video can be projected, for example, while keeping the aspect ratio of the input video, or with the aspect ratio approximate to the aspect ratio of the input video.

Further, besides the above, according to the projector 51 related to the present embodiment, by generating the corrected shape for projecting the video with the largest allowable size for fitting into the screen 2 while keeping the aspect ratio of the input video, or with the aspect ratio approximate to the aspect ratio of the input video, it is possible to project the video with the largest allowable size for fitting into the screen 2 while keeping the aspect ratio of the input video, or with the aspect ratio approximate to the aspect ratio of the input video.

As described above, according to the projector 51 related to the present embodiment, the effective corrected shape of the image can be realized.

Specifically, in the projector 51 according to the present embodiment, a plurality of correction values is calculated and then stored in advance so as to correspond to the plurality of aspect ratios, then the appropriate correction value is selected in accordance with the aspect ratio of the input video out of the plurality of correction values thus stored and is used for the distortion correction, and then every time the aspect ratio of the input video is changed, an appropriate correction value is selected in accordance with the aspect ratio of the input video thus changed, and is used for the distortion correction.

It should be noted that in the projector according to the present embodiment, it is possible to adopt a configuration of using the correction value (e.g., a correction value corresponding to a fixed aspect ratio determined in advance) determined in advance to be used in the case in which there is no correction value appropriate to the aspect ratio of the input video in the plurality of correction values stored in advance, in the case in which it is determined that it is the case, for example.

Here, once the projector 51 according to the present embodiment is installed, for example, the projector 51 is used for a certain period of time in, for example, a meeting with the installation position fixed. On this occasion, in the projector 51 according to the present embodiment, in the case in which the input video is switched, for example, by a user operation or automatically by the device, and the aspect ratio of the input video is changed, the aspect ratio determination section 15 determines the aspect ratio of the input video at the present moment, and the correction value storage/selection section 62 selects the correction value in accordance with the determination result. It should be noted that in such a case, if the installation positions of the projector 51 and the screen 2 are fixed, it is sufficient for the process (the process of detecting the relative positional relationship between the panel and the screen frame) of projecting the measurement pattern to be performed once at the beginning, and the detection result in the first turn of the process can be used in the subsequent process.

As a configuration example, the image display device (the projector 51 in the present embodiment) is provided with an image input section (the video input section 11 in the present embodiment) to which the image (the video in the present embodiment) is input, the aspect ratio determination section 15 for determining the aspect ratio of the image input to the image input section, a correction section (the correction value calculation section 61, the correction value storage/selection section 62, and the distortion correction section 12 in the present embodiment) for performing the correction on the image input to the image input section so that the image has an aspect ratio corresponding to the aspect ratio determined by the aspect ratio determination section 15, and the projection section 14 for projecting the image on which the correction is performed by the correction section.

As a configuration example, the image display device is provided with a pattern storage section 13 for storing a pattern (the measurement pattern in the present embodiment) determined in advance, the image capturing section 16 for capturing the image of the pattern stored in the pattern storage section 13 and projected by the projection section 14 and the image of the projection object (the screen 2 in the present embodiment), and the image analysis section 17 for detecting the relative positional relationship between the image of the projection panel corresponding to the image of the pattern and the image of the projection object based on the image shot by the capturing section 16, and the correction section performs the correction based on the result of the detection by the image analysis section 17.

As a configuration example, in the image display device, the correction section performs the correction so that at least either one of the vertical dimension and the horizontal dimension of the image thus corrected becomes the largest with respect to the frame of the projection object.

As a configuration example, in the image display device, the correction section includes the correction value calculation section 61 for calculating the correction value for performing the distortion correction on the image input to the image input section so that the image has the aspect ratio for each of the plurality of aspect ratios different from each other, a correction value storage section (the storage section of the correction value storage/selection section 62 in the present embodiment) for storing the correction values for the plurality of aspect ratios different from each other calculated by the correction value calculation section 61, a correction value selection section (the selection section of the correction value storage/selection section 62 in the present embodiment) for selecting the correction value out of the plurality of correction values stored in the correction value storage section in accordance with the aspect ratio determined by the aspect ratio determination section 15, and the distortion correction section 12 for performing the distortion correction on the image input to the image input section using the correction value selected by the correction value selection section.

As a configuration example, in the image display device, the correction value selection section selects the correction value corresponding to the same aspect ratio as the aspect ratio determined by the aspect ratio determination section 15 (or the correction value corresponding to the aspect ratio having the difference from the aspect ratio determined by the aspect ratio determination section 15 within the range determined in advance) out of the plurality of correction values stored in the correction value storage section. Further, the correction value selection section selects a correction value determined in advance in the case in which there is no correction value to be selected in accordance with the aspect ratio determined by the aspect ratio determination section 15.

Outline of Embodiments

Although the embodiments of the invention are hereinabove described in detail with reference to the accompanying drawings, the specific configuration is not limited to the embodiments described above, but the design and so on within the scope or the spirit of the invention are also included therein.

It should be noted that it is also possible to arrange that the program for realizing the function of an arbitrary constituent in the device (the projectors 1, 51 in the embodiments described above) explained hereinabove is recorded on a computer readable recording medium, and then the program is read and then performed by the computer system. It should be noted that the "computer system" mentioned here should include an operating system (OS) and the hardware such as peripheral devices. Further, the "computer-readable recording medium" denotes a portable recording medium such as a flexible disk, a magneto-optical disk, a read-only memory (ROM), and a CD-ROM (compact disk-ROM), and a storage device such as a hard disk incorporated in the computer system. Further, the "computer-readable recording medium" should include those holding a program for a certain period of time such as a volatile memory (a random access memory (RAM)) in a server or a computer system to be a client in the case of transmitting the program via a network such as the Internet, or a communication line such as a telephone line.

Further, the program described above can be transmitted from the computer system having the program stored in the storage device or the like to another computer system via a transmission medium or using a transmission wave in the transmission medium. Here, the "transmission medium" for transmitting the program denotes a medium having a function of transmitting information such as a network (a communication network) such as the Internet or a communication line (a communication wire) such as a telephone line.

Further, the program described above can be for realizing a part of the function described above. Further, the program described above can be a program, which can realize the function described above when being combined with a program recorded on the computer system in advance, namely a so-called differential file (a differential program).

What is claimed is:

1. An image display device to which an image is input, comprising:
    a processor configured to act as:
        an aspect ratio determination section adapted to determine an aspect ratio of the image; and
        a correction section adapted to perform a correction on the image so that the image has an aspect ratio corresponding to an aspect ratio determined by the aspect ratio determination section, the correction section including:
            a correction value storage device adapted to store correction values respectively for a plurality of aspect ratios different from each other,
            a correction value selection section adapted to select the correction value out of the plurality of correction values stored in the correction value storage device in accordance with the aspect ratio determined by the aspect ratio determination section, and
            a distortion correction section adapted to perform the distortion correction on the image using the correction value selected by the correction value selection section; and
        a projection device adapted to project the image on which the correction is performed by the correction section,
    if the aspect ratio of a projection object is between 4:3 and 16:10 and the aspect ratio of the image is 4:3, the correction section performs correction so that the upper side and the lower side of the corrected image coincide with the upper side and the lower side of the projection object, and the left side and the right side of the corrected image is narrower than the left side and the right side of the projection object, and if the aspect ratio of the projection object is between 4:3 and 16:10 and the aspect ratio of the input image is 16:10, the correction section performs correction so that the left side and the right side of corrected image coincides with the left side and the right side of the projection object, and the upper side and the lower side of corrected image is narrower than the upper side and the lower side of the projection object,
    the correction value selection section selects one of the correction values corresponding to an aspect ratio equal to the aspect ratio determined by the aspect ratio determination section and the correction value corresponding to the aspect ratio having a difference from the aspect ratio determined by the aspect ratio determination section within a range determined in advance out of the plurality of correction values stored in the correction value storage device, and selects a correction value determined in advance in a case in which there is no correction value to be selected in accordance with the aspect ratio determined by the aspect ratio determination section.

2. The image display device according to claim 1, further comprising:
    a pattern storage device adapted to store a pattern determined in advance;
    the processor further configured to act as an image capturing section adapted to capture an image of the pattern, which is stored in the pattern storage device and projected by the projection section, and an image of a projection object; and
    the processor further configured to act as an image analysis section adapted to detect a relative positional relationship between an image of a projection panel corresponding to the image of the pattern and the image of the projection object based on the images shot by the image capturing section,
    wherein the correction section performs the correction based on a result of the detection by the image analysis section.

3. The image display device according to claim 2, wherein the correction section performs the correction so that at least either one of a vertical dimension and a horizontal dimension of the image corrected becomes the largest with respect to a frame of the projection object.

4. The image display device according to claim 1, wherein the correction section includes
    a correction value calculation section adapted to calculate a correction value adapted to perform a distortion correction on the image so that the image has an aspect ratio equal to the aspect ratio determined by the aspect ratio determination section, and
    a distortion correction section adapted to perform the distortion correction on the image using the correction value calculated by the correction value calculation section.

5. The image display device according to claim 1, wherein the correction section further includes:
    a correction value calculation section adapted to calculate the correction value adapted to perform a distortion correction on the image for each of the plurality of aspect ratios different from each other so that the image has the aspect ratio.

6. An image display method comprising:
    utilizing a processor for:
        determining, by an aspect ratio determination section, an aspect ratio of an image input to an image display device; and
        performing, by a correction section, a correction on the image so that the image has an aspect ratio corresponding to an aspect ratio determined by an aspect ratio determination section, the correction section including:
- a correction value storage device adapted to store correction values respectively for a plurality of aspect ratios different from each other,
- a correction value selection section adapted to select the correction value out of the plurality of correction values stored in the correction value storage device in accordance with the aspect ratio determined by the aspect ratio determination section, and
- a distortion correction section adapted to perform the distortion correction on the image using the correction value selected by the correction value selection section;

projecting, by a projection device, the image on which the correction is performed by the correction section, if the aspect ratio of a projection object is between 4:3 and 16:10 and the aspect ratio of the image is 4:3, the correction section performs correction so that the upper side and the lower side of the corrected image coincide with the upper side and the lower side of the projection object, and the left side and the right side of the corrected image is narrower than the left side and the right side of the projection object, and if the aspect ratio of the projection object is between 4:3 and 16:10 and the aspect ratio of the input image is 16:10, the correction section performs correction so that the left side and the right side of corrected image coincides with the left side and the right side of the projection object, and the upper side and the lower side of corrected image is narrower than the upper side and the lower side of the projection object, and the correction value selection section selects one of the correction values corresponding to an aspect ratio equal to the aspect ratio determined by the aspect ratio determination section and the correction value corresponding to the aspect ratio having a difference from the aspect ratio determined by the aspect ratio determination section within a range determined in advance out of the plurality of correction values stored in the correction value storage device, and selects a correction value determined in advance in a case in which there is no correction value to be selected in accordance with the aspect ratio determined by the aspect ratio determination section.

7. A non-transitory computer-readable medium storing an image display program adapted to allow a computer to execute a process utilizing a processor, the process comprising:

determining, by an aspect ratio determination section, an aspect ratio of an image input to an image display device;

performing, by a correction section, a correction on the image so that the image has an aspect ratio corresponding to an aspect ratio determined by an aspect ratio determination section, the correction section including:
- a correction value storage device adapted to store correction values respectively for a plurality of aspect ratios different from each other,
- a correction value selection section adapted to select the correction value out of the plurality of correction values stored in the correction value storage device in accordance with the aspect ratio determined by the aspect ratio determination section, and
- a distortion correction section adapted to perform the distortion correction on the image using the correction value selected by the correction value selection section; and projecting, by a projection device, the image on which the correction is performed by the correction section, if the aspect ratio of a projection object is between 4:3 and 16:10 and the aspect ratio of the image is 4:3, the correction section performs correction so that the upper side and the lower side of the corrected image coincide with the upper side and the lower side of the projection object, and the left side and the right side of the corrected image is narrower than the left side and the right side of the projection object, and if the aspect ratio of the projection object is between 4:3 and 16:10 and the aspect ratio of the input image is 16:10, the correction section performs correction so that the left side and the right side of corrected image coincides with the left side and the right side of the projection object, and the upper side and the lower side of corrected image is narrower than the upper side and the lower side of the projection object, and the correction value selection section selects one of the correction values corresponding to an aspect ratio equal to the aspect ratio determined by the aspect ratio determination section and the correction value corresponding to the aspect ratio having a difference from the aspect ratio determined by the aspect ratio determination section within a range determined in advance out of the plurality of correction values stored in the correction value storage device, and selects a correction value determined in advance in a case in which there is no correction value to be selected in accordance with the aspect ratio determined by the aspect ratio determination section.

* * * * *